(12) United States Patent
Dumont et al.

(10) Patent No.: US 8,218,088 B2
(45) Date of Patent: Jul. 10, 2012

(54) VIDEO APPARATUS WITH A RECEIVER AND PROCESSING MEANS

(75) Inventors: Frank Dumont, Singapore (SG); Chee Lam Tan, Singapore (SG)

(73) Assignee: Thomson Licensing (FR)

( * ) Notice: Subject to any disclaimer, the term of this patent is extended or adjusted under 35 U.S.C. 154(b) by 308 days.

(21) Appl. No.: 10/813,973

(22) Filed: Mar. 31, 2004

(65) Prior Publication Data

US 2004/0218102 A1   Nov. 4, 2004

(30) Foreign Application Priority Data

Apr. 11, 2003  (EP) .................................. 03100989

(51) Int. Cl.
*H04N 5/52* (2006.01)
(52) U.S. Cl. ........................ 348/678; 348/725
(58) Field of Classification Search .................. 348/678, 348/679, 685, 255, 558, 705–706, 725–726, 348/731, 733, 735, 553–555; 455/136, 138, 455/241.1, 239
See application file for complete search history.

(56) References Cited

U.S. PATENT DOCUMENTS

| | | | |
|---|---|---|---|
| 5,508,748 A * | 4/1996 | Krishnamurthy et al. .... 348/475 |
| 5,526,052 A | 6/1996 | Ar ................................. 348/405 |
| 5,565,932 A * | 10/1996 | Citta et al. ..................... 348/678 |
| 5,673,293 A * | 9/1997 | Scarpa et al. .................. 375/321 |
| 5,710,602 A | 1/1998 | Gardos et al. ................. 348/586 |
| 6,252,633 B1 * | 6/2001 | Ruitenburg ................... 348/725 |
| RE37,326 E * | 8/2001 | Kim ............................... 348/725 |
| 6,421,098 B1 * | 7/2002 | Oya .............................. 348/678 |
| 7,006,150 B2 * | 2/2006 | Van Der Wijst et al. ...... 348/554 |
| 7,075,585 B2 * | 7/2006 | Favrat et al. ................... 348/554 |
| 2007/0147406 A1 * | 6/2007 | Perlman et al. ............... 370/412 |

FOREIGN PATENT DOCUMENTS

JP            2002010107        1/2002

OTHER PUBLICATIONS

Patent Abstracts of Japan, vol. 012, No. 007, Jan. 9, 1998, JP62166665, Jul. 23, 1987, abstract only.
"SAA6750H Encoder for MPEG2 Image Recording (EMPIRE), Product Datasheet", May 3, 2000, Philips Semiconductors.

* cited by examiner

*Primary Examiner* — Trang U Tran
(74) *Attorney, Agent, or Firm* — Jack Schwartz and Associates, PLLC

(57) ABSTRACT

A video apparatus has a receiver for receiving and converting an RF signal into a video signal. The video signal is then processed (notably encoded) into an encoded digital stream by processing means. The processing means is adjusted based on an indicator of a characteristic of the RF signal.

15 Claims, 4 Drawing Sheets

VIDEO APPARATUS WITH A RECEIVER AND PROCESSING MEANS

This application claims the benefit under 35 U.S.C. §119 of European application number 03100989.7, filed Apr. 11, 2003.

FIELD OF THE INVENTION

The invention relates to a video apparatus with a receiver and processing means.

BACKGROUND OF THE INVENTION

A video apparatus often comprises a receiver which is meant to produce a video signal (e.g. an analogue video signal according to the NTSC or PAL standard) based on an RF signal received from a remote broadcaster.

It becomes common practice nowadays to provide such a video apparatus with an encoder (e.g. a MPEG encoder) in order to convert the received video signal into an encoded stream (e.g. a MPEG encoded digital stream).

This is useful notably to record the received video sequence as a digital stream on a medium, for instance on a DVD or on a hard-disk drive located in the apparatus.

A problem in such a system is that the received video signal may be noisy and may lead therefore to an encoded stream with defects (artefacts). These defects clearly appear as macro-blocks when the video sequence coded by the encoded stream is displayed.

In order to avoid appearance of these artefacts, the video signal is sometimes processed in a specific way; for instance, the video signal is processed through a low-pass filter before being encoded. However, this specific processing generally has some limitations or drawbacks; for instance, the low-pass filter removes the details of the video sequence (high frequency part of the video signal), even when the received video signal has a good quality (good signal-to-noise ratio) and would lead to correct encoding with a weaker low-pass filter keeping more details.

SUMMARY OF THE INVENTION

In order to avoid encoding defects while keeping the video signal untouched as far as possible, the invention proposes a video apparatus comprising a receiver for converting an RF signal into a video signal, processing means receiving the video signal and outputting an encoded stream based on the video signal, an indicator of a characteristic of the RF signal and control means for adjusting the processing means based on the indicator.

It is thus possible to adjust the processing depending on the received RF signal, for instance depending on its amplitude and/or quality, to best match the treatment needed by the signal.

According to a advantageous embodiment, the processing means includes an adjustable filter and the control means includes means for adjusting the adjustable filter based on the indicator.

The receiver outputs for instance the video signal as an analogue signal and a video decoder converts the analogue signal into a digital stream.

The adjustable filter is for instance part of the video decoder.

According to another possible solution, that may be combined with the previous one, the processing means includes an encoder having an adjustable encoding bit-rate and the control means includes means for adjusting the encoding bit-rate based on the indicator.

The characteristic is for instance the amplitude of the RF signal.

The indicator may be a voltage controlling the gain of an amplifier of the receiver. Effectively, the gain of the amplifier is generally controlled to be inversely proportional to the RF signal amplitude and can therefore be taken as an indicator of the RF signal strength.

When the receiver comprises a tuner which outputs an IF signal, the indicator may also be the amplitude of the IF signal.

According to a advantageous embodiment, the control means comprises a micro-processor. The micro-processor preferably has means for receiving a signal representative of the indicator and means for sending control data to adjust the processing means.

BRIEF DESCRIPTION OF THE DRAWINGS

Other features of the invention will appear in the below description made in reference to FIG. 1 representing a video apparatus according to a first embodiment of the invention.

DETAILED DESCRIPTION OF PREFERRED EMBODIMENTS

Figure 1:
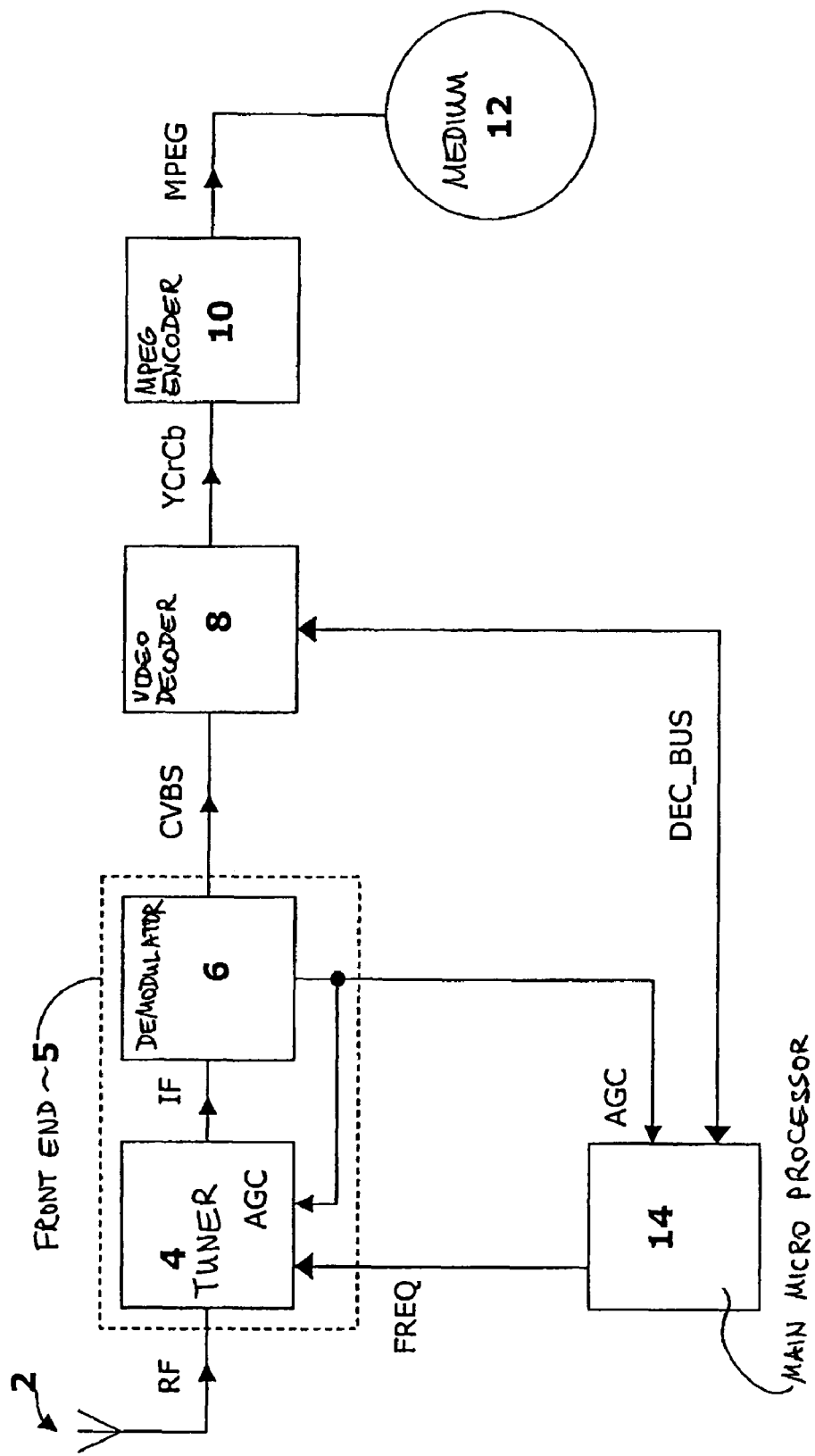

The video apparatus of FIG. 1 receives an RF signal (radio frequency signal) on an antenna 2. A tuner 4 converts the RF signal at a selected frequency to a signal IF at the intermediate frequency. The selected frequency is determined by frequency data FREQ received from a main micro-processor 14 of the video apparatus over a tuner bus and corresponds to a channel for the user.

The signal IF at the intermediate frequency is converted into an analogue base band video signal CVBS by a demodulator 6. This analogue video signal is a viewable signal, for instance a PAL-,SECAM- or NTSC-formatted analogue video signal.

The tuner 4 and the demodulator 6 are implemented together in a front-end 5 which forms the essential element of the receiver.

Figure 2:
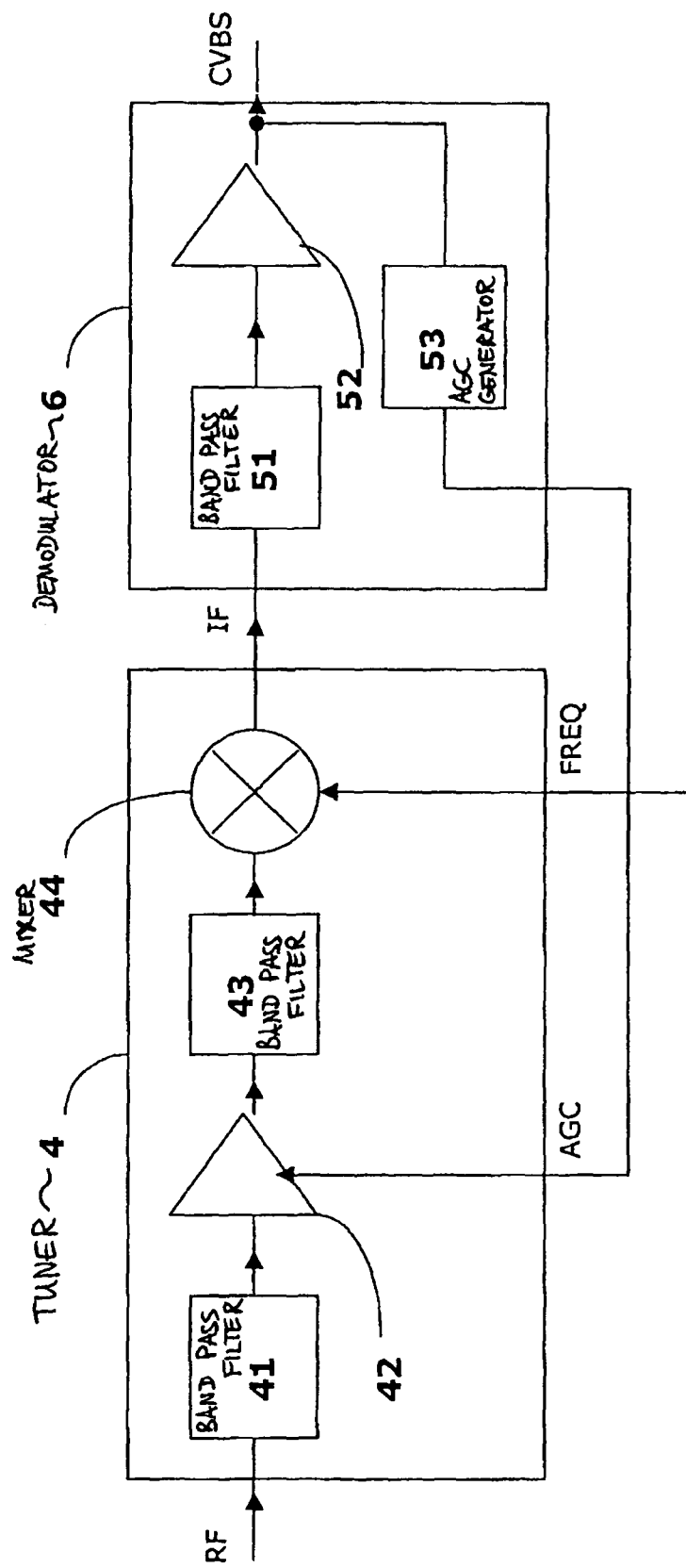
FIG. 2 detailing the front-end of the video apparatus of FIG. 1.

A detailed view of the front-end 5 is represented on FIG. 2.

The tuner 4 has a first band-pass filter (BPF) 41 filtering the incoming RF signal. The filtered RF signal is then amplified by an automatic gain controlled (AGC) amplifier 42, which gain is controlled by a control signal AGC (generally called the AGC feedback voltage) from the demodulator 6 as further explained below.

The amplified RF signal 42 goes through a second band-pass filter 43 to get to a mixer 44 where it is mixed with a frequency defined by the frequency data FREQ (based on user selection) so that the signal at the selected frequency (selected channel) is output from the tuner 4 at the intermediate frequency IF (IF signal).

The IF signal is then processed trough the demodulator 6, i.e. roughly speaking through a third band-pass filter 51 and an amplifier 52, into an analogue video signal CVBS. Based on this analogue video signal CVBS, and notably on the amplitude of this analogue video signal CVBS, the AGC feedback voltage (control signal AGC for the AGC amplifier 42) is generated by an AGC generator 53.

The theoretical purpose of the AGC amplifier 42 is to get a constant amplitude or envelope of the output analogue video signal CVBS whatever the level (or amplitude) of the received RF signal. This aim is generally reached by adapting the gain of the AGC amplifier 42 thanks to the AGC generator 53, depending on the amplitude of the analogue video signal CVBS (according to the feedback principle).

However, the AGC amplifier 42 practically has a limited range and the low and very low RF signals cannot consequently be amplified to the desired amplitude in the analogue video signal CVBS. In such a case, the AGC generator consequently keeps on requesting the maximum possible amplification and correspondingly sends out a high level AGC feedback voltage, for instance 3.8 V.

For theses reasons, when the RF signal is above 60 dBµV, the AGC gain of AGC amplifier 42 is controlled by varying the AGC feedback voltage below 3.8 V to get a roughly constant envelope of the output video signal CVBS (which corresponds to an IF signal of 102 dBµV). When the RF signal is below 60 dBµV, the gain of AGC amplifier 42 is controlled to be maximum, by transmitting an AGC feedback voltage of 3.8 V.

Figure 3:
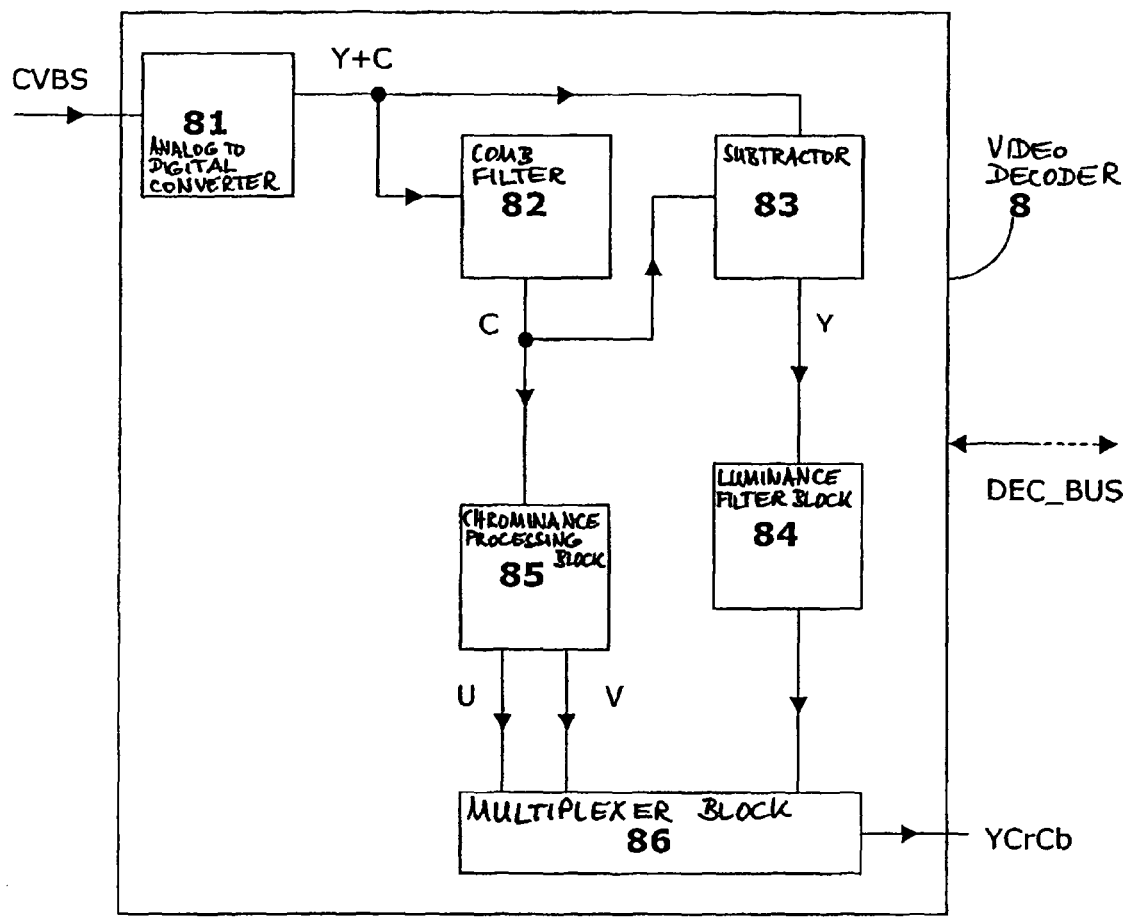
FIG. 3 detailing the video decoder of the video apparatus of FIG. 1.

Back to FIG. 1, the analogue video signal CVBS output by the demodulator 6 is transmitted to a video decoder 8 (e.g. one of the Philips SAA711x family) which converts it into a digital video stream YCrCb, for instance as a 4:2:2 stream. An exemplary video decoder 8 is represented on FIG. 3.

The incoming analogue video signal CVBS is converted into an unprocessed digital stream Y+C by an analogue-to-digital converter (ADC) 81. A comb filter 82 separates the chrominance from the unprocessed digital stream Y+C and outputs an unprocessed chrominance stream C. The unprocessed chrominance stream C is notably passed to a subtractor 83 to be subtracted from the unprocessed digital stream Y+C in order to output the unprocessed luminance stream Y.

The unprocessed luminance stream Y is processed trough a luminance filter block 84 which can be operated as an adjustable sharpness filter. The luminance or sharpness filter is adjusted according to control data (parameter LUFI[3:0] for the Philips SAA711x family) received from the main micro-processor 14 over a decoder bus DEC_BUS as explained below.

The unprocessed chrominance stream C is processed through a chrominance processing block 85 which notably separates the two chrominance components U and V.

The processed luminance stream and chrominance streams U, V are received by a multiplexer block 86 which combines them into a digital video stream YCrCb. The multiplexer block 86 may also provide further processing of the digital stream, such as saturation control.

The digital video stream YCrCb is encoded into a MPEG stream by an MPEG encoder 10. The MPEG stream is then ready to be recorded on a medium 12.

The main micro-processor 14 receives the AGC feedback voltage from the demodulator 6 and sets the control data for the adjustable sharpness filter depending on the gain.

As explained above, when the AGC feedback voltage AGC is low, for instance below 3.5 V, a strong RF signal is received and the signal-to-noise ratio is good; the main micro-processor then sets the control data and consequently the adjustable sharpness filter to light filtering.

When the AGC feedback voltage is high, for instance above 3.5 V, the received RF signal is low and a poor signal-to-noise ratio is expected; the main micro-processor 14 then sets the control data and consequently the adjustable sharpness filter to strong filtering of the high frequency components of the pictures.

The table below gives an example of the adjustment of the sharpness filter of the video decoder 8 depending on the gain of the amplifier of the tuner 4, for an encoding bit-rate of 3.7 Mbps (which can be used for Long Play recording). This look-up table is stored in a memory linked to the main microprocessor 14.

| AGC feedback voltage | Control data to video decoder (for sharpness filter selection) |
|---|---|
| Below 3.5 V | LUFI[3:0] = 0000 |
| Above 3.5 V | LUFI[3:0] = 1011 |

Figure 4:
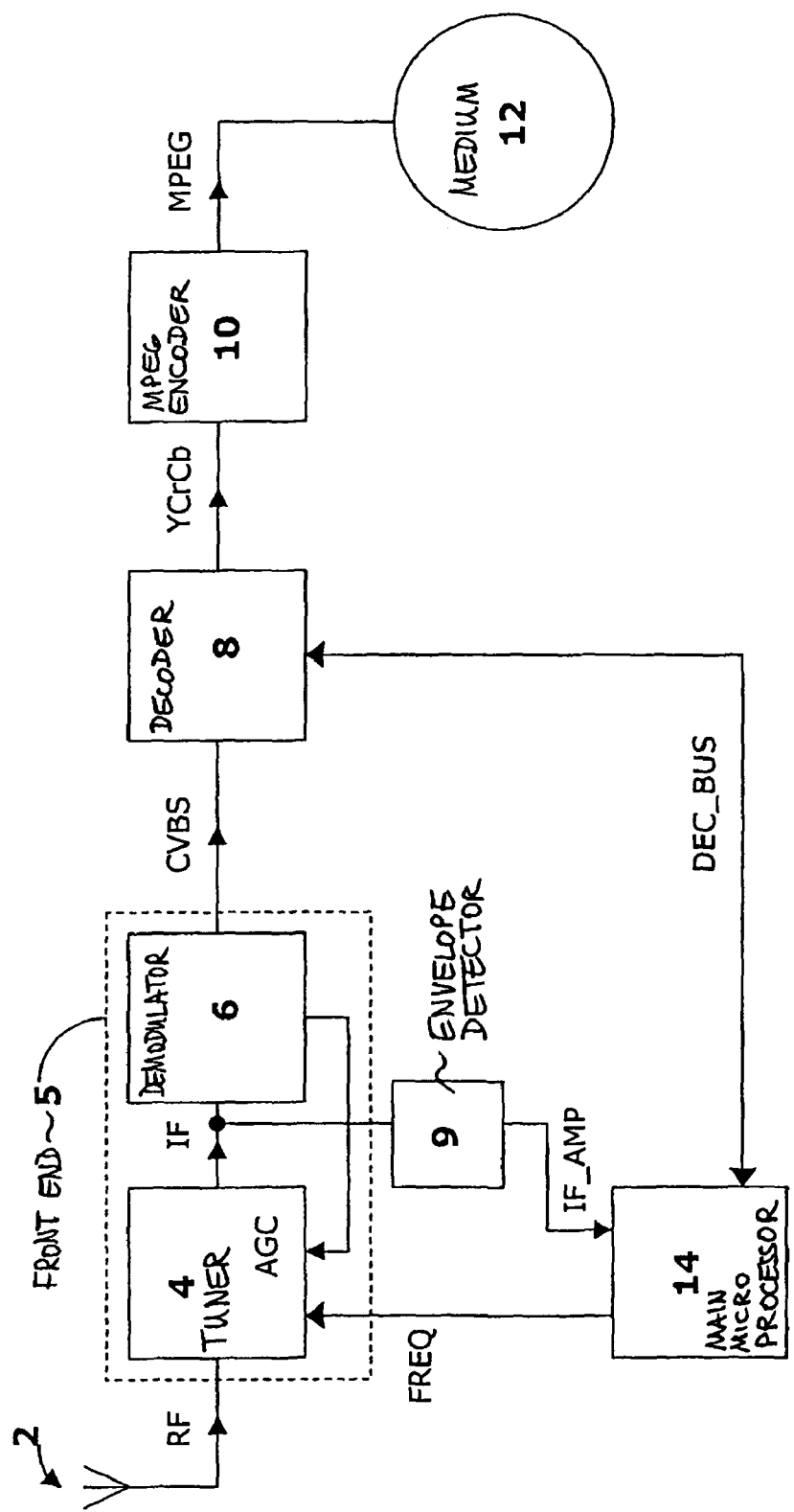
FIG. 4 representing a video apparatus according to a second embodiment of the invention.

FIG. 4 represents a second embodiment of the invention. Reference should be made to the above description of FIGS. 1 to 3 for parts which are unchanged.

In the second embodiment, an envelope detector 9 generates a envelope voltage IF_AMP representative of the amplitude (or envelope) of the IF signal output from the tuner 4. The envelope voltage IF_AMP is received on a pin of the main micro-processor 14.

The main micro-processor 14 adjusts the adjustable sharpness filter of the decoder 8 (i.e. sends out control data on the decoder bus DEC_BUS adjusting the sharpness filter) depending on the envelope voltage IF_AMP.

As previously explained, when the RF signal is above. 60 dBµV, the AGC amplifier 42 is controlled to output a nominal value, which corresponds to an IF signal having an amplitude of 102 dBµV. A value of envelope voltage IF_AMP corresponding to 102 dBµV is thus indicative of a strong received signal and presumably a good signal-to-noise ratio.

When the RF signal is below 60 dBµV, the AGC amplifier 42 is controlled to full amplification (about 42 dB) as discussed above but this will deliver an IF signal lower than 102 dBµV. As for RF signals below 60dBµV the amplification ratio is constant (maximal, i.e. about 42 dB), the envelope of the IF signal is a good indicator of the strength of the received RF signal. The envelope voltage IF_AMP below a value corresponding to 102 dBµV is therefore indicative of a small RF signal and the accurate value is indicative of how small the RF signal is.

The below table can be used for instance to control the adjustable sharpness filter of the decoder 8 depending on the envelope voltage IF_AMP indicative of the strength (or amplitude) of the RF signal.

| IF signal envelope according to envelope voltage IF_AMP | Control data to video decoder (for sharpness filter selection) |
|---|---|
| 102 dBµV | LUFI[3:0] = 0000 |
| 97 dBµV | LUFI[3:0] = 1011 |
| 87 dBµV | LUFI[3:0] = 1100 |

The invention is of course not limited to the embodiments which have been described above.

Notably, other parameters of the receiver can be used instead of the gain of an amplifier as an indicator of the reception quality.

Similarly, the operating parameter of the receiver can be transmitted by other means than described above. For instance, the operating parameter which is used as an indicator of the reception quality can be transmitted over the tuner bus.

Besides, the invention does not specify whether the filter is analogue or digital. The adjustable filter can consequently act before or after analogue-to-digital conversion.

As already indicated, other parts of the processing means than the adjustable filter can be adjusted depending on the receiver parameter the encoding bit-rate of the encoder can for instance be adjusted based on the receiver parameter. Similarly, other filters, such as a filter for luminance/chrominance noise reduction in the MPEG encoder 10, can be used.

What is claimed is:

1. Video apparatus comprising:
    a receiver for converting an analog RF signal into an analog video signal;
    video processing means for filtering the analog video signal and providing an indicator of a characteristic of the analog RF signal, said video processing means including an analog to digital converter for converting the filtered analog video signal into a digital stream and an adjustable sharpness filter for processing a luminance component of the digital stream; and
    control means for generating a control signal for adjusting the adjustable sharpness filter, said control signal being based on the indicator of a characteristic of the analog RF signal provided by the video processing means.

2. Video apparatus according to claim 1, wherein the video processing means comprise a video decoder that converts the analog signal into a digital stream.

3. Video apparatus according to claim 2, wherein the video decoder comprises the adjustable sharpness filter.

4. Video apparatus according to claim 1, wherein the video processing means includes an encoder having an adjustable encoding bit-rate and wherein the control means includes means for adjusting the encoding bit-rate based on the indicator of a characteristic of the analog RF signal.

5. Video apparatus according to claim 1, wherein the characteristic of the analog RF signal is the amplitude of the RF signal.

6. Video apparatus according to claim 1, wherein the indicator of a characteristic of the analog RF signal is a voltage controlling the gain of an amplifier of the receiver.

7. Video apparatus according to claim 1, wherein the receiver comprises a tuner which outputs an IF signal and wherein the indicator of a characteristic of the analog RF signal is the amplitude of the IF signal.

8. Video apparatus according to claim 1, wherein the control means comprises a micro-processor.

9. Video apparatus according to claim 8, wherein the micro-processor has means for receiving a signal representative of the indicator of a characteristic of the analog RF signal and means for sending control data to adjust the video processing means.

10. Video apparatus according to claim 4, wherein the characteristic of the analog RF signal is the amplitude of the RF signal.

11. Video apparatus according to claim 4, wherein the indicator of a characteristic of the analog RF signal is a voltage controlling the gain of an amplifier of the receiver.

12. Video apparatus according to claim 4, wherein the receiver comprises a tuner which outputs an IF signal and wherein the characteristic of the analog RF signal is the amplitude of the IF signal.

13. Video apparatus according to claim 4, wherein the control means comprises a micro-processor.

14. Video apparatus according to claim 13, wherein the micro-processor has means for receiving a signal representative of the indicator of a characteristic of the analog RF signal and means for sending control data to adjust the video processing means.

15. Video apparatus comprising:
    a receiver for converting an RF signal into an analog video signal;
    video processing means receiving the video signal, encoding the analog video signal with an adjustable encoding bit-rate, outputting a compression encoded stream based on the video signal, and providing an indicator of a characteristic of the analog RF signal, said video processing means including an adjustable sharpness filter;
    control means for adjusting an encoding bit-rate target value for the compression encoded stream used by the video processing means for the encoding of the analog video signal and adjusting filtering of said adjustable sharpness filter, said adjustment being based on the indicator of a characteristic of the analog RF signal provided by the video processing means.

* * * * *